United States Patent [19]

Johnson

[11] 4,032,615

[45] June 28, 1977

[54] METHOD FOR THE SAFE DISPOSAL OF ALKALI METAL

[75] Inventor: Terry R. Johnson, Wheaton, Ill.

[73] Assignee: The United States of America as represented by the United States Energy Research and Development Administration, Washington, D.C.

[22] Filed: Jan. 27, 1976

[21] Appl. No.: 651,981

[52] U.S. Cl. .............................. 423/179; 423/641
[51] Int. Cl.² .......................................... C01D 104
[58] Field of Search ................ 423/198, 641, 179

[56] References Cited

UNITED STATES PATENTS

| 2,202,270 | 5/1940 | Scott | 423/641 |
| 2,527,443 | 10/1950 | Padgitt | 423/641 |
| 3,134,645 | 5/1964 | Szechtman | 423/641 |

OTHER PUBLICATIONS

Jacobson, Encyclopedia of Chemical Reactions, vol. VI, (1956) pp. 257, 353.

*Primary Examiner*—O. R. Vertiz
*Assistant Examiner*—Wayne A. Langel
*Attorney, Agent, or Firm*—Dean E. Carlson; Frank H. Jackson; Hugh W. Glenn

[57] ABSTRACT

Alkali metals such as those employed in liquid metal coolant systems can be safely reacted to form hydroxides by first dissolving the alkali metal in relatively inert metals such as lead or bismuth. The alloy thus formed is contacted with a molten salt including the alkali metal hydroxide and possibly the alkali metal carbonate in the presence of oxygen. This oxidizes the alkali metal to an oxide which is soluble within the molten salt. The salt is separated and contacted with steam or steam-$CO_2$ mixture to convert the alkali metal oxide to the hydroxide. These reactions can be conducted with minimal hydrogen evolution and with the heat of reaction distributed between the several reaction steps.

5 Claims, 1 Drawing Figure

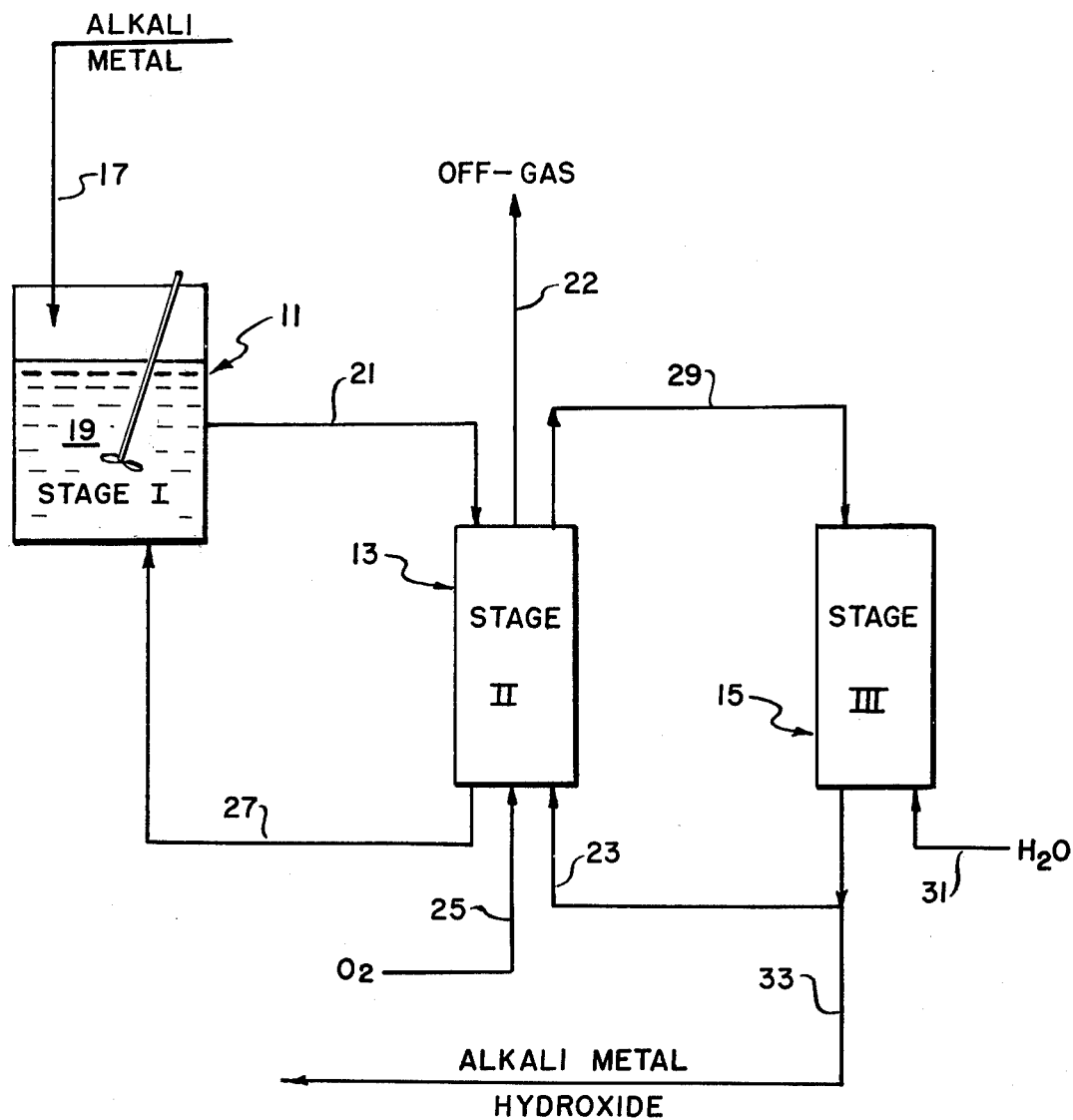

METHOD FOR THE SAFE DISPOSAL OF ALKALI METAL

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a method for the safe disposition of alkali metals. It is particularly applicable to the disposal of sodium, potassium or alloys of these metals that have been employed in nuclear reactor coolant systems.

In the past small quantities of highly reactive alkali metals were easily eliminated by reaction with water to form alkali metal hydroxides and hydrogen gas. The hydrogen gas was quickly diluted with air and dispersed while the metal hydroxide could be retained or diluted with water for disposal.

Large quantities of alkali metals have been used in recent years within liquid metal cooled nuclear reactors. Such reactors, often cooled with liquid sodium or liquid sodium potassium alloy (NaK), contain extremely large volumes of these highly reactive metals. The disposal of such large quantities of these materials presents previously unthoughtof problems due to their highly exothermic reactions with water and resulting generation of hydrogen gas. Where the liquid metal coolants may be contaminated with radioisotopes, such reactions become even less attractive as a disposal method. In addition, dilution with large volumes of water is undesirable if the waste product must be stored and shielded.

In copending patent application Ser. No. 624,030 filed Oct. 20, 1975, by Lewis, alkali metals are reacted with water in caustic solution with steam added to dilute evolved $H_2$ gas. Although this method is an improvement over other prior processes, hydrogen gas evolution, the volume of waste products and the possible presence of radioactive material remain troublesome.

SUMMARY OF THE INVENTION

Therefore, in view of these disadvantages associated with prior art processes, it is an object of the present invention to provide a method of disposal for alkali metals in which minimal hydrogen gas is evolved. It is also an object to provide such a method in which the exothermic heat of reaction can be released in incremental steps. It is a further object to provide such a disposal method in which the final volume of waste materials is minimized.

In accordance with the present invention the alkali metal to be disposed is dissolved within a melt of a metal or metals that are substantially inert to salts of the alkali metal. The melt is then contacted with a salt containing the alkali metal hydroxide and a gas containing oxygen. This converts the alkali metal to an oxide which is dissolved in the salt. The salt is separated from the melt and contacted with a gas containing $H_2O$ to convert the alkali metal oxide to its hydroxide. The excess salt produced can be withdrawn for storage and the remainder recycled to continue the process.

The substantially inert, molten metals used for dissolving the alkali metal are those that will not react to replace the alkali metal within its hydroxide or oxidize appreciably in the presence of the alkali metal. These inert metals are those which are substantially below the alkali metals in the electromotive force series of elements. As a practical matter, only those inert metals that can be provided as a melt at temperatures at which the alkali metal hydroxide can be conveniently maintained in molten state are suitable. These inert metals preferably include such low melting point metals as lead, bismuth, tin, antimony, cadmium, indium and alloys of these materials.

In a more specific aspect of the present method, the molten salt can include both hydroxide and carbonate. The carbonate concentration of the molten salt can be maintained by contacting the salt including dissolved alkali metal oxide with a gas containing both water and carbon dioxide. The use of carbonates within the salts can reduce corrosiveness to process vessels.

BRIEF DESCRIPTION OF THE DRAWING

The present invention is illustrated in the accompanying drawing which is a schematic flow diagram of an alkali metal disposal process.

DESCRIPTION OF THE PREFERRED EMBODIMENT

In the drawing, the three principle stages or reactions of the alkali metal disposal process are illustrated at 11, 13 and 15. In the first stage an alkali metal 17, such as molten sodium, potassium, lithium or alloys of these materials, is dissolved within a melt 19 of an inert metal or an alloy of inert metals. In most instances, this dissolution reaction will be exothermic giving off a portion of the heat that must be dissipated in converting the alkali metal to its hydroxide. For example, the dissolution of about 20 weight percent sodium in a lead melt can dissipate as much as 30% of this total energy release.

The molten alloy thus formed 21 is next contacted with a molten salt 23 including the hydroxide of the alkali metal in stage II of the process. A gas 25 containing oxygen such as air, is passed into contact with the molten salt and metal mixture in stage II to oxidize the alkali metal to its oxide. The net reaction in the case of sodium metal dissolved in lead is as follows:

$$2\ Na(Pb) + \tfrac{1}{2}\ O_2(\text{gas}) \rightarrow Na_2O(NaOH)$$

This reaction represents about 40% of the total change in enthalpy between Na and NaOH.

The molten salt and inert metal phases are next separated; the inert metal 27 returning to use in the first stage and the molten salt 29 advancing to the third stage. Any off-gas produced is vented at 22. Within the second stage the oxygen feed rate and the concentration of the alkali metal within the discharged inert metal at 27 can be controlled to minimize the equilibrium concentrations of alkali metal hydride, hydrogen and water and to prevent oxidation of the inert metal.

For instance, sufficient oxygen gas is employed to be in excess of that required to react with the hydrogen and alkali metal hydride. Also the flow of inert metal with dissolved alkali metal is at a sufficient rate to maintain a small concentration of alkali metal within discharge flow 27. Merely by way of example about 2 to 6 weight percent sodium can be maintained within a flow of lead at 27.

In the third stage, the alkali metal hydroxide containing dissolved alkali metal oxide is contacted with a gas stream 31 containing steam to react with the alkali metal oxide and form the alkali metal hydroxide. In the case of sodium metal, the following reaction occurs:

$$Na_2O + H_2O \rightarrow 2 NaOH$$

This final reaction releases the remainder or about 30% of the exothermic heat on converting Na to NaOH in these reactions. Part of the alkali metal hydroxide is removed as waste product 33 for storage or other disposition and the remainder is recycled 23 to the second stage for performing that portion of the process.

The inert metal selected for dissolution of the alkali metal is one that is substantially less reactive with oxidizing agents than the alkali metal to be processed. The inert metal will not be oxidized by the oxygen-containing gas in the second stage of the process nor will it replace the alkali metal within the alkali metal hydroxide. Suitable inert metals are those which are substantially below the selected alkali metal within the electromotive force series of elements (see *Handbook of Chemistry and Physics*, page 1651, 36th Edition, Chemical Rubber Publishing Company 1954). Since the alkali metals are quite readily oxidized, a large number of metals can be considered as substantially inert in respect to these alkali metals. However, it is necessary to select low melting metals and their alloys in order to provide a melt at temperatures sufficiently low to prevent substantial vaporization of the molten salt and undue corrosive attack on containment materials. From these criteria the metals lead, cadmium, bismuth, tin, antimony and indium and alloys of these materials are preferred choices for the inert metal melt. These metals other than antimony melt at below 350° C. Alloy compositions of these metals with melting points of between about 50 – 250° C. are presented in Metals Handbook, Vol. 1, "Properties and Selections of Metals", page 864, 8th Edition, American Society for Metals, 1961.

The molten salt 23 will include the hydroxides of the alkali metals to be processed. For example, where an alloy composition of sodium and potassium metal (NaK) is processed, the salt will include sodium hydroxide and potassium hydroxide in about equal proportions to the sodium and potassium within the alloy mixture. Where lithium metals are processed the salt will also include lithium hydroxide. In order to inhibit corrosion of the containment materials that will probably include such metals as iron, nickel, chromium and cobalt, alkali metal carbonates such as sodium carbonate, potassium carbonate and lithium carbonate can be included into the salt. Although the carbonates have somewhat higher melting temperatures than the alkali hydroxides, their solubilities are also high. For example at 400° C. the solubility of $Na_2CO_3$ in NaOH is greater than 35 wt %. Also, sodium hydroxide and sodium carbonate form a single eutectic having a melting point of 286° C. at 22 wt % in $Na_2CO_3$.

Where carbonates are included within the salt solution, they can be replenished merely by adding carbon dioxide gas to the stream 31 introduced to the third stage. Where sodium alkali metal is contemplated, the sodium oxide is then removed from the molten salt by the following reactions:

$$Na_2O + H_2O \rightarrow 2 NaOH$$

$$Na_2O + CO_2 \rightarrow Na_2CO_3$$

By controlling the stoichiometric quantities of $CO_2$ and $H_2O$ added to the third stage, the desired amount of sodium carbonate can be maintained within the molten salt.

Although the present invention has been described in terms of three separate stages in a continuous process, it will be clear that the separate steps and reactions can be performed as a batch process with the three reactions carried out in sequence. The melt of inert metals and the molten salt can each be held in separate reservoirs when not in use within the batch process.

Where releases from this process to the environment are undesirable, such as in the processing of radioactive sodium, the off-gas 22 from the second stage can be returned to the same stage by the addition of oxygen and recompression. Thus there would be no gaseous effluents from the entire process.

The following example is presented to further illustrate the present invention:

EXAMPLE

One part by weight sodium metal is dissolved in 4 parts by weight lead at about 400° C. The resulting lead-sodium alloy is contacted with three parts by weight molten sodium hydroxide at 400° C. while 0.4 parts by weight oxygen in air is passed through the salt-metal mixture. After most of the sodium metal has reacted to form sodium oxide, the molten-metal and molten-salt layers are separated. The molten lead still contains approximately 5% by weight sodium and is recycled for processing of further sodium metal. The molten salt with about 3 parts sodium hydroxide and about 1.4 parts sodium oxide is contacted with sufficient steam at about 400° C. to react all the sodium oxide to form additional sodium hydroxide. A portion of the sodium hydroxide is retained for further processing of lead-sodium alloy while the excess is removed for suitable disposal. The volume of sodium hydroxide will have a volume of only about 0.8 that of the sodium metal initially processed since the sodium hydroxide is a much denser material.

It can be seen from the above example and description that the present process provides a safe method for disposing of reactive alkali metals without generation of large amounts of hydrogen gas and without incurring all of the heat of reaction within a single process reaction. By dividing these exothermic and energetic processes into three separate stages, greater control over heat release can be maintained. The process also minimizes the amount of water involved and produces a dense hydroxide as the disposal product to minimize the volume of material requiring storage or other disposal.

The embodiment of the invention in which an exclusive property or privilege is claimed are defined as follows:

1. In a method for disposing of molten alkali metal by converting it to alkali metal hydroxide, the improvement comprising dissolving said alkali metal within a melt of a metal selected from the group consisting of lead, bismuth, tin, antimony, cadmium, indium, and alloys of these materials; contacting said melt with a molten salt including hydroxide of said alkali metal and with a gas including oxygen to convert said alkali metal to an alkali metal monoxide dissolved within said salt;

separating said salt containing alkali metal monoxide from said melt; and contacting said salt a gas containing $H_2O$ to convert said alkali metal monoxide to alkali metal hydroxide whereby hydrogen evolution is nearly eliminated and heat of reaction is evolved in a plurality of reaction steps.

2. The method of claim 1 wherein said molten salt comprises a mixture of alkali metal hydroxide and alkali metal carbonate.

3. The method of claim 2 wherein said gas containing $H_2O$ also includes $CO_2$.

4. The method of claim 1 wherein said alkali metal is selected from the group consisting of sodium and potassium.

5. The method according to claim 1 wherein each of said steps of dissolving said alkali metal in said melt, contacting said melt with molten salt and contacting said salt with a gas including $H_2O$ is performed in a separate vessel to permit incremental evolution of the heats of reaction and to enhance reaction control.

* * * * *

UNITED STATES PATENT OFFICE
CERTIFICATE OF CORRECTION

Patent No. 4,032,615  Dated  June 28, 1977

Inventor(s) Terry R. Johnson

It is certified that error appears in the above-identified patent and that said Letters Patent are hereby corrected as shown below:

Column 5, line 2, after "contacting said salt" insert --with--.

Signed and Sealed this

Twenty-second Day of November 1977

[SEAL]

Attest:

RUTH C. MASON
Attesting Officer

LUTRELLE F. PARKER
Acting Commissioner of Patents and Trademarks